United States Patent [19]

Crouch et al.

[11] 4,364,744
[45] Dec. 21, 1982

[54] BURNER FOR THE PARTIAL OXIDATION OF SLURRIES OF SOLID CARBONACEOUS FUELS

[75] Inventors: William B. Crouch, Chappaqua, N.Y.; George N. Richter, San Marino, Calif.; Charles P. Marion, Mamaroneck, N.Y.; Blake Reynolds, Riverside, Conn.; Albert Brent, Huntington; Edward T. Child, Tarrytown, both of N.Y.

[73] Assignee: Texaco Inc., White Plains, N.Y.

[21] Appl. No.: 247,967

[22] Filed: Mar. 26, 1981

Related U.S. Application Data

[62] Division of Ser. No. 107,215, Dec. 26, 1979, Pat. No. 4,338,099.

[51] Int. Cl.³ .............................................. C10J 3/50
[52] U.S. Cl. ............................. 48/86 R; 48/DIG. 7; 239/132.3; 239/427.3; 239/432; 239/434.5
[58] Field of Search ..................... 48/197 R, 200, 201, 48/203, 206, 201, 212, 215, DIG. 7, 95, 64, 73, 180 F, 180 C, 86 R, 63, 77; 252/373; 431/2, 354; 110/261, 347; 239/400, 427, 427.3, 427.5, 428, 8, 9, 423, 132.3, 432, 434.5

[56] References Cited

U.S. PATENT DOCUMENTS

| | | | |
|---|---|---|---|
| 1,389,563 | 8/1921 | Boehm et al. | 239/432 |
| 1,451,063 | 4/1923 | Anthony | 239/427.3 |
| 1,738,082 | 12/1929 | Stark | 239/434.5 |
| 2,630,183 | 3/1953 | Foutz | 239/432 |
| 2,861,900 | 11/1958 | Smith et al. | 239/132.3 |
| 3,418,062 | 12/1968 | Hovis et al. | 239/423 |
| 3,945,942 | 3/1976 | Mavin et al. | 48/200 |
| 3,972,690 | 8/1976 | Os | 48/212 |

FOREIGN PATENT DOCUMENTS 543003  1/1932  Fed. Rep. of Germany ... 239/427.5

Primary Examiner—Peter F. Kratz
Attorney, Agent, or Firm—Carl G. Ries; Robert A. Kulason; Albert Brent

[57] ABSTRACT

A burner and process for the partial oxidation of pumpable slurries of solid carbonaceous fuels in which the pumpable slurry of solid carbonaceous fuel in a liquid carrier is passed in liquid phase through one passage of a burner comprising a retracted central coaxial conduit, an outer coaxial conduit with a converging orifice at the downstream tip of the burner and, optionally, an intermediate coaxial conduit. The downstream tips of the central conduit and the intermediate conduit, if any, are retracted upstream from the burner face a distance of respectively two or more say 3 to 10 for the central conduit, and about 0 to 12 say 1 to 5 for the intermediate conduit times the minimum diameter of the converging orifice of the outer conduit at the burner tip. A pre-mix zone is thereby provided comprising one or more, say 2 to 5 coaxial pre-mix chambers in series. The free-oxygen containing stream is passed through a separate passage of the burner into the pre-mix zone, in which mixing takes place with the slurry of solid carbonaceous fuel and liquid carrier. From 0 to 100, say about 2 to 80, volume % of the liquid carrier may be vaporized in the pre-mix zone. The multiphase mixture of reactants is then discharged into the reaction zone of the free-flow partial oxidation gas generator by way of the converging orifice of the outer conduit at the burner tip. Synthesis gas, fuel gas, or reducing gas is thereby produced.

17 Claims, 6 Drawing Figures

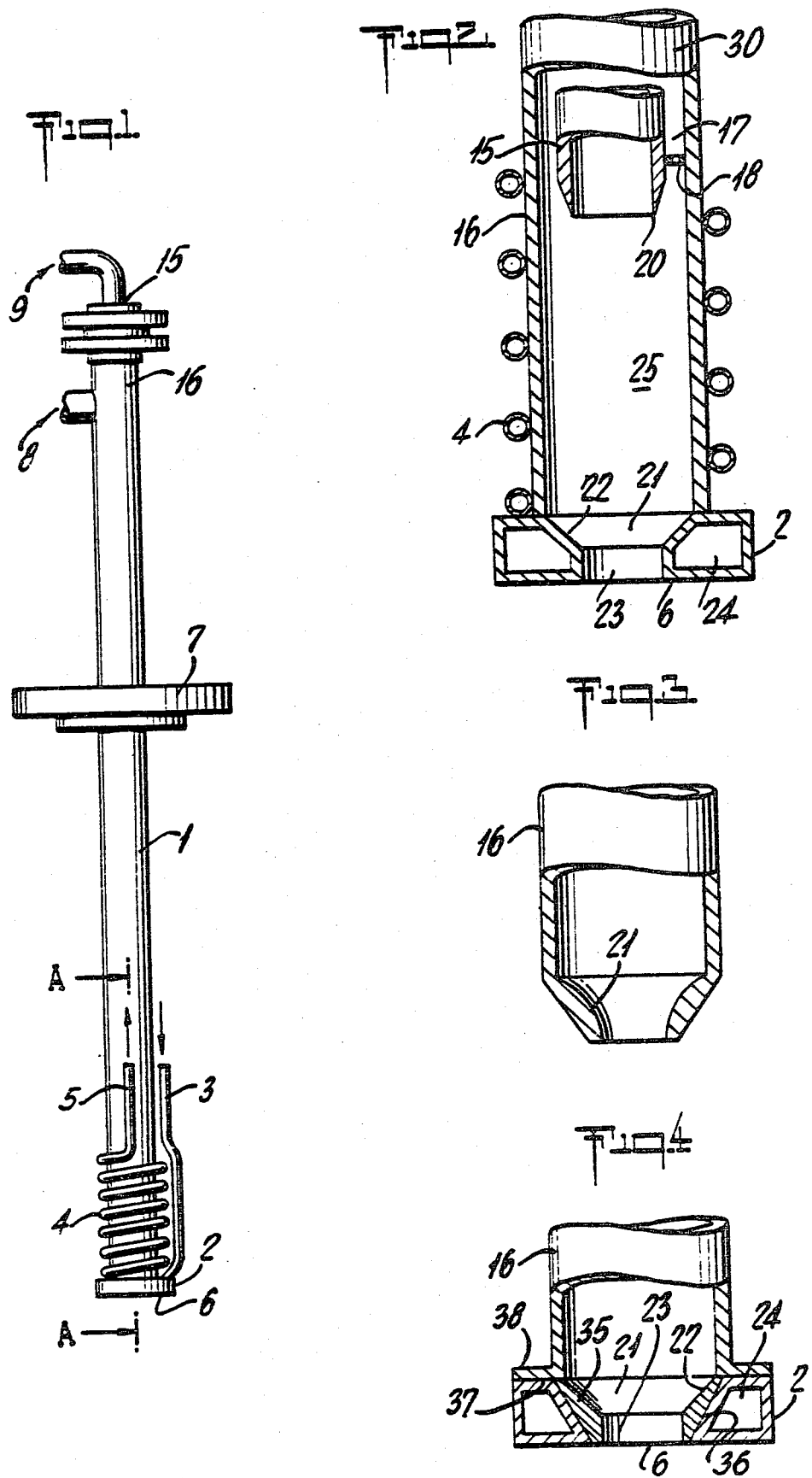

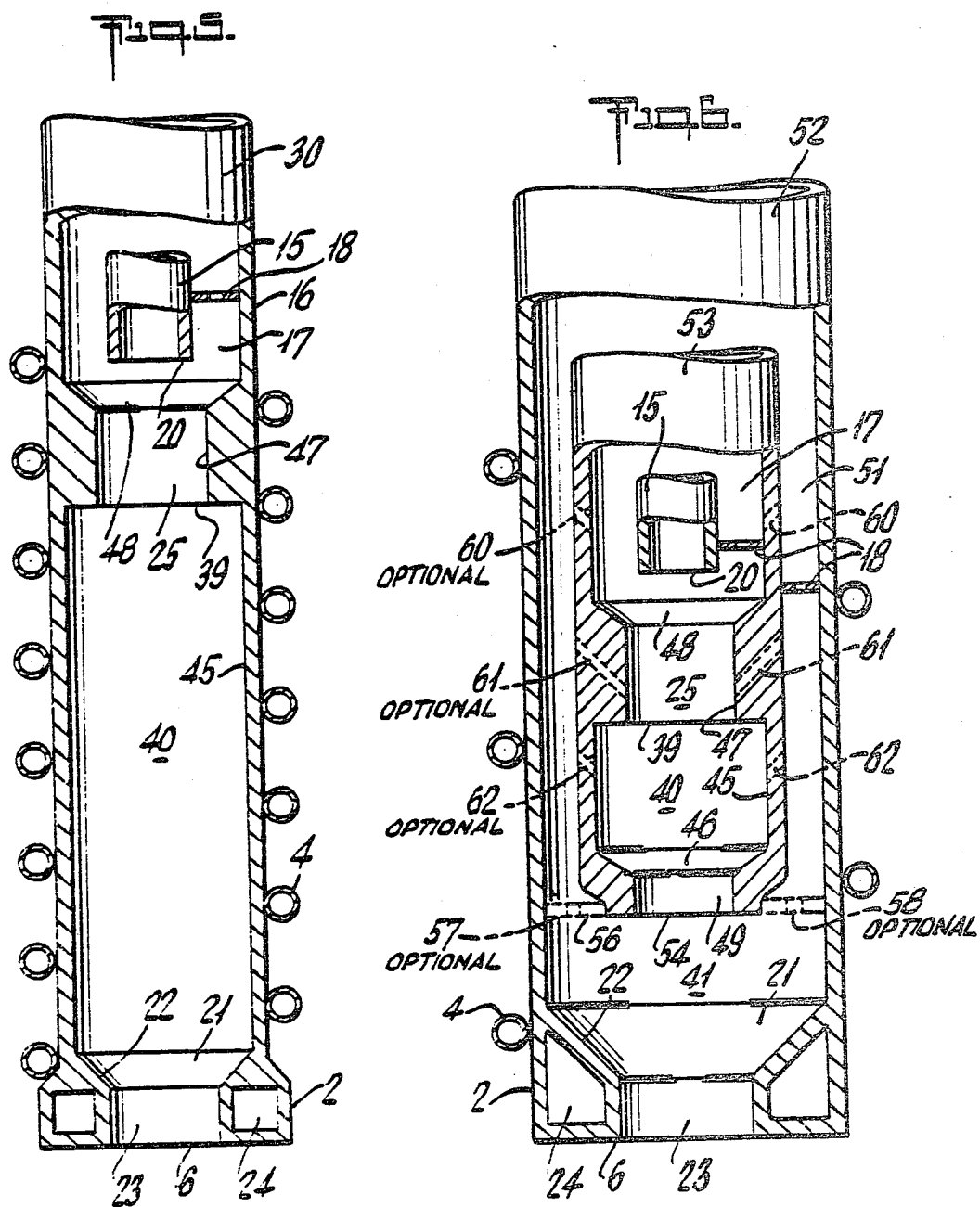

BURNER FOR THE PARTIAL OXIDATION OF SLURRIES OF SOLID CARBONACEOUS FUELS

This is a division of application Ser. No. 107,215, filed Dec. 26, 1979 now U.S. Pat. No. 4,338,099.

BACKGROUND OF THE INVENTION

1. Field of the Invention

This invention relates to the manufacture of gaseous mixtures comprising $H_2$ and CO, e.g., synthesis gas, fuel gas, and reducing gas by the partial oxidation of pumpable slurries of solid carbonaceous fuels in a liquid carrier. In one of its more specific aspects, the present invention relates to the burner for such gas manufacture.

2. Description of the Prior Art

Annulus-type burners have been employed for introducing liquid hydrocarbonaceous fuels into a partial oxidation gas generator. For example, coassigned U.S. Pat. No. 3,528,930 shows a single annulus burner, and coassigned U.S. Pat. No. 3,847,564 shows a double annulus burner. The nozzle tip of the central conduit of such previous burners are substantially flush with or close to the face of the burner.

Substantially no premixing of the reactants takes place upstream from the face of the burner, in such prior art burners. This is to prevent the burner tip from burning up due to the high reactivity between oxygen and hydro-carbons. Accordingly in such burners, substantially all of the atomizing and mixing of the fuel stream with the oxygen stream takes place downstream from the face of the burner.

SUMMARY OF THE INVENTION

In the partial oxidation of liquid phase slurries of solid carbonaceous fuels to produce synthesis gas, fuel gas, or reducing gas, problems of combustion instability and poor efficiency which may be encountered with flush face burners have been eliminated by employing the subject invention. The subject novel burner includes an internal pre-mix zone in which two or three feedstreams to the reaction zone of a partial oxidation gas generator are mixed together without ignition and optionally preheated to vaporize from 0 to 100 vol. % of the liquid carrier. The burner comprises a retracted central coaxial conduit and an outer coaxial conduit with an annular passage therebetween. A converging exit nozzle terminates the outer conduit at the downstream end of the burner. In another embodiment, an intermediate coaxial conduit is interposed between the central and outer conduits thereby providing intermediate and outer annular passages. Optionally, the intermediate conduit may contain a plurality of small diameter holes or passages to permit at least a portion of the gaseous material flowing in the outer annular passage to pass through and mix with the materials flowing through the intermediate annular passage and/or the pre-mix zone.

The tip of the inner central conduit and the intermediate conduits if any, are retracted upstream from the face of the burner a distance of respectively two or more times, say 3 to 10 times, and 0 to 12 times, say 2 to 5 times the minimum diameter of the converging exit nozzle of the outer conduit at the tip of the burner, thereby providing a pre-mix zone comprising one or more, say 2 to 5 coaxial pre-mix chambers in series. The pre-mix zone is located between the downstream tip of said central conduit and the face of the burner at the downstream end. The reactant streams are separately introduced into the pre-mix zone by way of said central conduit and annular passage or passages. In the pre-mix zone, the reactants are thoroughly mixed together and simultaneously about 0 to 100 vol. %, say about 2 to 80 vol. % of the liquid carrier may be vaporized. In one embodiment, the mixture leaving one pre-mix chamber expands into the next pre-mix chamber in the line. The change in velocity of the mixture flowing through the successive pre-mix chambers assures a thorough mixing of the feed streams prior to discharge from the burner. The multiphase mixture is passed through the converging exit nozzle on the downstream end of the outer conduit at a discharge velocity which is greater than the flame propagating velocity.

BRIEF DESCRIPTION OF THE DRAWING

In order to illustrate the invention in greater detail, reference is made to several embodiments involving burner constructions as shown in the figures of the drawing, wherein FIG. 1 is a general illustration of the burner assembly;

FIG. 2 is a diagramatic longitudinal cross-section through the downstream end of the burner, taken at line A—A of FIG. 1 and showing an embodiment of the burner;

FIG. 3 is a view of another example of the tip exit orifice at the downstream tip of coaxial outer conduit 16 shown in FIG. 2;

FIG. 4 is a view of another example of the downstream tip of outer conduit 16 shown in FIG. 2 in which the exit orifice is made from an erosion-resistant material such as silicon carbide or tungsten carbide 35;

FIG. 5 is a diagramatic longitudinal cross-section through the downstream end of the burner, taken at line A—A of FIG. 1 which shows another embodiment of the burner in which there is one annular passage 17 and the pre-mix zone comprises two free-flow coaxial chambers 25 and 40 in series; and FIG. 6 is a diagramatic longitudinal cross-section through the downstream end of the burner, taken at line A—A of FIG. 1 and showing another embodiment of the burner in which there are two annular passages 17 and 51 and the pre-mix zone comprises three free-flow coaxial pre-mix chambers 25, 40, and 41 in series.

DESCRIPTION OF THE INVENTION

The present invention involves a novel burner and the process for the manufacture of gas mixtures rich in hydrogen and carbon-monoxide, such as synthesis gas, fuel gas, and reducing gas, by the partial oxidation of a liquid phase slurry of solid carbonaceous fuel with a free-oxygen containing gas such as air, oxygen-enriched air or substantially pure oxygen. The product gas mixture is produced in the reaction zone of a noncatalytic, refractory-lined, free-flow partial oxidation gas generator, such as described in coassigned U.S. Pat. No. 2,809,104 issued to Dale M. Strasser et al at a temperature in the range of about 1700° to 3500° F. and a pressure in the range of about 1 to 300 atmospheres, such as about 5 to 100 atmospheres.

Problems of combustion instability and poor efficiency may be encountered when prior art flush face burners are used for the gasification of liquid phase slurries of solid carbonaceous fuels. For example, at times varying from start-up to 10 hours after start-up, with coal-water slurry feeds the following changes in the operation of the generator could occur: (1) the temperature measured at the top of the reaction zone may rise rapidly while there may be little or no rise of temperature at the bottom; (2) the product gas rate may decrease; at the same time, the $CO_2$ content of the gas may increase; (3) the particle size and amount of unconverted solids may increase. It may not be possible to correct the aforesaid rise in temperature in the reaction zone or the other changes mentioned by decreasing the oxidation rate or increasing the slurry rate. Further, said changes may occur more rapidly at higher pressures. The aforesaid problems may indicate poor mixing of the feeds. Further, part of the coal may be passing through the gas generator without contacting significant amounts of oxygen and the coal may be only devolatilized and fused. In such case, unreacted oxygen in the reaction zone may then react with the product gas.

These problems and others are avoided by employing the subject novel burner in which two or three feedstreams to the reaction zone of a free-flow partial oxidation gas generator are mixed together without igniting in an internal pre-mix zone and optionally pre-heated to vaporize from 0 to 100 vol. % of the liquid carrier of the slurry feedstream. For example, a slurry of solid carbonaceous fuel in water is passed into the burner in liquid phase. There it is thoroughly mixed with a separate stream of free-oxygen containing gas, and optionally with a temperature moderator. The feed streams are mixed together in a pre-mix zone located within the burner upstream from the exit nozzle. Optionally, the feed slurry may be simultaneously heated in the pre-mix zone of the burner by direct heat exchange with the other feed streams and/or indirect heat exchange with a portion of the combustion gases that are recirculating on the outside of the burner. By this means, from 0 to 100 vol. % such as about 2 to 80 vol. %, say about 5 to 25 vol. % of the liquid carrier in the slurry feed may be vaporized before the multiphase mixture of reactants leaves the pre-mix zone by way of a converging exit nozzle at the downstream end of the burner and directly enters the reaction zone of the partial oxidation gas generator.

Depending on such factors as the temperature, velocity, dwell time and composition of the feed streams; the desired amount of vaporization of liquid carrier; the temperature and amount of recycle gases in the generator; and the desired life of the burner; cooling coils may or may not encircle the outside barrel of the burner along its length. For similar reasons, the burner may or may not be provided with an annular shaped cooling chamber at the downstream end.

Embodiments of the subject burner include single and double annulus types with one or more, say 2 to 5 coaxial cylindrically shaped pre-mix chambers in series. In one embodiment, the mixture leaving one pre-mix chamber expands into the next pre-mix chamber in the line. The change in velocity of the mixture flowing through the successive pre-mix chambers assures a thorough mixing of the feed streams prior to discharge from the burner. The mixture is accelerated through the converging exit nozzle at the downstream end of the burner directly into the reaction zone of the partial oxidation gas generator.

Pumpable slurries in liquid phase having a dry solids content in the range of about 30 to 75 wt. %, say about 40 to 60 wt. % are passed through an inlet passage of the subject burner. The inlet temperature of the slurry is in the range of about ambient to 500° F., but below the vaporization temperature of the liquid carrier at the given inlet pressure in the range of about 76 to 4500 psia, say about 150 to 1500 psia.

The term solid carbonaceous fuels, as used herein to describe suitable solid carbonaceous feedstocks, is intended to include various materials and mixtures thereof from the group consisting of coal, coke from coal, char from coal, coal liquefaction residues, petroleum coke, particulate carbon soot, and solids derived from oil shale, tar sands, and pitch. All types of coal may be used including anthracite, bituminous, sub-bituminous, and lignite. The particulate carbon may be that which is obtained as a by-product of the subject partial oxidation process, or that which is obtained by burning fossil fuels. The term solid carbonaceous fuel also includes by definition bits of garbage, dewatered sanitary sewage, and semi-solid organic materials such as asphalt, rubber and rubber-like materials including rubber automobile tires which may be ground or pulverized to the aforesaid particle size. Any suitable grinding system may be used to convert the solid carbonaceous fuels of mixtures thereof to the proper size.

The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 425 $\mu$ m (Alternative No. 40).

The combined moisture content of the solid carbonaceous fuel particles is in the range of about 0 to 40 wt. %, such as 2 to 10 wt. %. Predrying may be required if necessary in some instances to reach these levels.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases).

Simultaneously, a stream of free-oxygen containing gas is supplied to the reaction zone of the gas generator by way of a free passage in the burner, and preferably through the central passage at a temperature in the range of about ambient to 1500° F., and preferably in the range of about ambient to 300° F., and a pressure in the range of above about 76 to 4500 psia, and preferably in the range of about 150 to 1500 psia. The atoms of free-oxygen plus atoms of organically combined oxygen in the solid carbonaceous fuel per atom of carbon in the solid carbonaceous fuel (O/C atomic ratio) may be in the range of 0.5 to 1.95. More specifically, with substantially pure oxygen feed to the reaction zone the broad range of said O/C atomic ratio may be about 0.5 to 1.5 and preferably about 0.7 to 1.4. With air feed to the reaction zone, the broad range of said O/C atomic ratio may be about 0.7 to 1.6 and preferably about 0.9 to 1.4.

The term temperature moderator as employed herein includes gaseous streams of $H_2O$, $CO_2$, $N_2$ and a recycle portion of the gas stream produced in the gas generator.

The term liquid carrier, as used herein as the suspending medium to produce pumpable slurries of solid carbonaceous fuels is intended to include various materials from the group consisting of water, liquid hydrocarbonaceous material, and mixtures thereof. However, water is the preferred carrier for the particles of solid carbonaceous fuel. In one embodiment, the liquid carrier is liquid carbon dioxide. In such case, the weight ratio of $CO_2$ to solid carbonaceous fuel in the slurry is in the range of about 0.6 to 2.0; and the $CO_2$-solid fuel slurry may be introduced into the burner at a temperature in the range of about −67° F. to 100° F. depending on the pressure.

The term liquid hydrocarbonaceous material as used herein to describe suitable liquid carriers, is intended to include various materials, such as liquified petroleum gas, petroleum distillates and residues, gasoline, naphtha, kerosine, crude petroleum, asphalt, gas oil, residual oil, tar sand oil and shale oil, coal derived oil aromatic hydrocarbon (such as benzene, toluene, xylene fractions), coal tar, cycle gas oil from fluid-catalytic-cracking operation, furfural extract of coker gas oil, methanol, ethanol and other alcohols and by-product oxygen containing liquid hydrocarbons from oxo or oxyl synthesis, and mixtures thereof.

In one embodiment, the liquid slurry comprises 40 to 60 wt. % of solid carbonaceous fuel in liquid $CO_2$.

In another embodiment, a single annulus pre-mix burner is employed and the feedstream comprises a slurry of liquid hydrocarbonaceous material and solid carbonaceous fuel. $H_2O$ in liquid phase in the amount of about 5 to 95 wt. % may be mixed with the liquid hydrocarbonaceous carrier, for example as an emulsion. Alternately, a portion of the $H_2O$ i.e., about 0 to 25 vol. % may be introduced as steam in admixture with the free-oxygen containing gas.

For all embodiments of the subject retracted central conduit single and multi-annulus-type burners, the downstream tip of the central and intermediate conduits are retracted upstream from the face of the burner a distance of respectively of two or more times say 3 to 10 for the tip of the central conduit, and 0 to 12, say 1 to 5 for the tip of the intermediate conduit times the minimum diameter of the converging orifice of the outer conduit at the burner tip. In one embodiment the set-back for the tip of the intermediate conduit is greater than the set-back for the tip of the center conduit.

The set-back provides space for a pre-mix zone. The pre-mix zone comprises one or more, say 2 to 5 coaxial pre-mix chambers in series. When supplemental steam is employed as a temperature moderator, all of the steam may be passed through one passageway. Alternatively, about 0 to 25 volume percent of the steam may be mixed with the stream of free-oxygen containing gas and passed through one passageway, and the remainder of the steam may be passed through the remaining passageway.

The subject single and multi-annulus pre-mix burners may be operated with the feedstreams passing through alternate passages in the burner. Typical modes of operation are summarized in Tables I to III below.

Table I lists the materials being introduced into the gasifier by way of the burner and their corresponding symbol. The solid carbonaceous fuel (B), water (C), and liquid hydrocarbonaceous material (E) may be mixed together in various combinations upstream from the burner inlet to produce a pumpable slurry which may be introduced into the burner and then passed through one of the several free-flow passages of the burner as shown in Table II for the single annulus pre-mix burner (see FIGS. 2 and 5); and as shown in Table III for the double annulus pre-mix burner (see FIG. 6). For example, the first entry in Table II shows that a pumpable slurry stream comprising solid carbonaceous fuel (B) in admixture with water (C) may be passed through the retracted central conduit 15 of a single annulus pre-mix burner i.e. FIG. 2 and 5 while simultaneously a stream of free-oxygen containing gas may be passed through annular passage 17.

Other modes of operation of the subject invention are possible in addition to those shown in Tables II and III.

With respect to the operation of a double annulus embodiment of the subject burner, the second entry of Table III shows that free-oxygen containing gas (A) may be passed through both annular passages. In such case, any member of the following group may be simultaneously passed through one or both annular passages 17 and 51: air, oxygen-enriched air, and substantially pure oxygen. Also, as shown in the seventh entry in Table III, free-oxygen containing gas (A) in admixture with steam (D) (say up to 25 vol. % of the total amount of $H_2O$) may be passed through the central conduit 15 and the remainder of the $H_2O$ as water (C) may be passed through the intermediate annulus 17 as part of the liquid carrier for the slurry.

When the liquid carrier for the slurry of solid carbonaceous fuel is a liquid hydrocarbonaceous material premature combustion within the burner may be avoided by one or more of the following:
(1) keeping the fuel below its autoignition temperature,
(2) including water in the solid fuel slurry,
(3) using air or air enriched with oxygen i.e. up to about 40 vol. % $O_2$,
(4) mixing steam with the air,
(5) employing a double annulus pre-mix burner (FIG. 6) in which the tip of the intermediate exit nozzle has about 0 retraction from the face of the burner. In such case, the free-oxygen containing gas such as substantially pure oxygen may be separately passed through the outer annular passage of the burner and into the reaction zone of the gas generator where it reacts by partial oxidation with the multiphase mixture discharged from the pre-mix zone of the burner, and
(6) discharging the multiphase mixture at the exit orifice at the tip of the burner with a discharge velocity which is greater than the flame propagation velocity.

TABLE I

| Material | Symbol |
| --- | --- |
| Free-Oxygen Containing Gas | A |
| Solid Carbonaceous Fuel | B |
| Water | C |
| Steam | D |
| Liquid Hydrocarbonaceous Material | E |
| Temperature Moderating Gas | F |

TABLE II

SINGLE ANNULUS PRE-MIX BURNER (See FIGS. 2 and 5)

| Central Conduit 15 | Annulus 17 |
| --- | --- |
| B + C | A |
| B + C + E | A |
| B + E | A + D |
| A | B + C |
| A | B + C + E |
| A + D | B + E |

TABLE III

DOUBLE ANNULUS PRE-MIX BURNER (See FIG. 6)

| Central Conduit 15 | Intermediate Annulus 17 | Outer Annulus 51 |
| --- | --- | --- |
| A | B + C | A |
| B + C | A | A |
| B + C | A | F |
| A | B + C + E | A |

TABLE III-continued

DOUBLE ANNULUS PRE-MIX BURNER (See FIG. 6)

| Central Conduit 15 | Intermediate Annulus 17 | Outer Annulus 51 |
| --- | --- | --- |
| A | B + C + E | A + D |
| D | B + C + E | A |
| A + D | B + C + E | A |
| B + C + E | A | A |
| B + C + E | D | A |
| B + C + E | A | D |
| A | B + E | A + D |
| A + D | B + E | A |
| A + D | B + E | A + D |
| D | B + E | A |
| A | B + E | D |
| B + E | A + D | A + D |
| B + E | A | A + D |
| B + E | D | A |
| B + E | A | D |
| A | B + E | F |
| B + C | | |
| A | E | |
| A | B + C | E |
| E | B + C | A |
| B + C | E | A |

The subject burner assembly is inserted downward through a top inlet port of a compact unpacked free-flow noncatalytic refractory lined synthesis gas generator, for example as shown in coassigned U.S. Pat. No. 3,544,291. The burner extends along the central longitudinal axis of the gas generator with the downstream end discharging a multiphase mixture of fuel, free-oxygen containing gas, and temperature moderator directly into the reaction zone.

The relative proportions of solid or solid and liquid fuel, water and oxygen in the feedstream to the gas generator are carefully regulated to convert a substantial portion of the carbon in the fuel e.g., up to about 90% or more by weight, to carbon oxides; and to maintain an autogenous reaction zone temperature in the range of about 1700° to 3500° F., preferably in the range of 2000° to 2800° F.

The dwell time in the reaction zone is in the range of about 1 to 10 seconds, and preferably in the range of about 2 to 8. With substantially pure oxygen feed to the gas generator, the composition of the effluent gas from the gas generator in mole % dry basis may be as follows: $H_2$ 5 to 40, CO 20 to 60, $CO_2$ 5 to 40, $CH_4$ 0.01 to 5, $H_2S+COS$ 0 to 5, $N_2$ nil to 5, and A nil to 1.5 With air feed to the gas generator, the composition of the generator effluent gas in mole % dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and A 0.5 to 1.5. Unconverted carbon and ash are contained in the effluent gas stream.

The hot gaseous effluent stream from the reaction zone of the synthesis gas generator is quickly cooled below the reaction temperature to a temperature in the range of about 250° to 700° F. by direct quenching in water, or by indirect heat exchange for example with water to produce steam in a gas cooler.

DESCRIPTION OF THE DRAWING

A more complete understanding of the invention may be had by reference to the accompanying schematic drawing which shows the subject invention in detail. Although the drawing illustrates a preferred embodiment of the invention, it is not intended to limit the subject invention to the particular apparatus or materials described. Corresponding parts in the several figures have the same reference numbers.

Referring to the figures in the drawing, in FIG. 1 the burner assembly for a retracted central conduit pre-mix burner having a single annulus and one pre-mix chamber is indicated generally as 1. Face-cooling chamber 2 is located at the downstream tip of the burner. Circulating cooling water enters by way of inlet pipe 3. The cooling water departs by way of coils 4 that encircle the outside diameter of the burner along its length and through outlet pipe 5. By means of cooling chamber 2 and cooling coils 4, burner 1 may be protected from thermal damage. Face 6 is at the outermost downstream tip of burner 1. Burner 1 is installed downwardly through a port in the top of a free-flow partial oxidation synthesis gas generator (not shown). The longitudinal central axis of burner 1 is preferably aligned along the central axis of the synthesis gas generator by means of mounting flange 7. Reactant streams pass into the burner by way of inlets 8 and 9.

In FIG. 2, the downstream end of burner 1 is shown in cross-section. This view is taken between A-A of FIG. 1 and comprises unobstructed inner coaxial retracted central conduit 15 and outer concentric coaxial conduit 16 which is disposed longitudinally about inner central conduit 15. Spacing means 18 provide a free-flow annular passage 17 between the outside diameter of central cylindrical conduit 15 and the inside diameter of outer cylindrical conduit 16. Exit orifice 20 at the downstream tip of central conduit 15, is preferably straight, circular in cross-section, and perpendicular to the longitudinal axis of the burner. Alternately, exit orifice 20 may be converging or diverging. Outer conduit 16 terminates at the downstream end of the burner with converging nozzle 21. A vertical cross-section of exit orifice 21 may be frusto-conically shaped, which may or may not merge into a right cylinder. Preferably for wear resistance, as shown in FIG. 2, nozzle 21 comprises a frusto-conical rear portion 22 that develops into a right cylindrical front portion 23 which terminates at the downstream face 6 of the burner. The cylindrical exit section will permit: (1) additional burner life because of increased surface available for abrasion, and (2) fabrication of a ceramic or refractory insert or an entire cooling chamber for a thermal and abrasion resistant material i.e., tungsten or silicon carbide in order to reduce damage and to extend burner life.

The height of the front cylindrical portion 23 of exit nozzle 21 is in the range of about 0 to 1.5, say about 0.1 to 1.0 times, its own diameter i.e. the minimum diameter of converging nozzle 21. The diameter of exit orifice 20 of central conduit 15 is in the range of about 0.2 to 1.5, say about 0.5 to 0.8 times the minimum diameter of converging nozzle 21.

The downstream end of the burner may or may not be cooled. Preferably, as shown in FIGS. 2, 4, 5 and 6, coaxial annular shaped cooling chamber 2 surrounds exit orifice 21 at the burner tip. By passing water through cored section 24 of cooling chamber 2, the tip of burner 1 may be prevented from overheating. Optionally for similar reasons, outer conduit 16 may be kept cool by passing water through coils 4. Suitable converging angles for orifice 21 are in the range from about 15° to 90° from the central longitudinal axis of the burner. The downstream tip of exit orifice 20 of central conduit 15 is severely retracted upstream from face 6 of burner 1 a distance of two or more times the minimum diameter of converging exit nozzle 21. For example, the setback of tip 20 of central conduit 15 from burner face 6 may be in the range of about 3 to 10 times the minimum diameter of converging exit nozzle 21. The space between tip 20 of central conduit 15 and burner face 6 constitutes the unobstructed pre-mix zone 25.

In the operation of burner 1, either reactant stream i.e. see Table II supra, may enter burner 1 by way of inlet 9 of FIG. 1 and pass directly from the upstream portion down through free-flow central conduit 15, through exit orifice 20, and into pre-mix zone 25, as shown in FIG. 2. Simultaneously and concurrently, the other reactant stream may enter burner 1 by way of inlet 8 of FIG. 1 and pass directly from the upstream portion 30 of outer conduit 16 down through free-flow annular passage 17 and into pre-mix zone 25 where intimate mixing of the two reactant streams takes place. Further, direct heat exchange between the two reactant streams takes place in pre-mix zone 25. The temperature in the pre-mix zone is controlled so that a controlled amount of the liquid carrier may be vaporized without burning i.e. from 0 to 100 vol. % say about 2 to 80 vol. %. Temperature control in the pre-mix zone may be effected by controlling such factors as dwell time and heat content of the entering streams, and amount of external cooling such as by coils 4, if any. Pre-mix zone 25 is substantially free from any obstruction to the free-flow of the materials passing therethrough.

The velocity of the slurry of solid carbonaceous fuel in liquid carrier passing through exit orifice 20 of central conduit 15 or alternately exiting from annular passage 17 is in the range of about 0.5 to 75 ft. per sec, say about 2 to 20 ft. per sec., while the corresponding velocity for the free oxygen containing gas simultaneously passing through the other passage in the burner optionally in admixture with steam, is in the range of about 85 feet per second to sonic velocity, say about 100 to 600 ft. per sec. The slurry of solid carbonaceous fuel in liquid carrier enters the pre-mix zone in liquid phase at a temperature in the range of about ambient to 500° F., and below the vaporization temperature of the liquid carrier, and at a pressure in the range of about 76° to 4500 psia. While simultaneously, the free-oxygen containing gas stream, optionally in admixture with steam, enters into the pre-mix zone at a temperature in the range of about ambient to 1200° F., say about 100° to 600° F., and at a pressure in the range of about 76 to 4500 psia. Intimate mixing and direct heat exchange takes place between the two reactant streams in the pre-mix zone. Volatilization of the liquid carrier in the pre-mix zone may amount to about 0 to 100 vol. %, say about 20 to 35 vol. % when the free-oxygen containing gas is introduced at a temperature in the range of about 300° to 600° F.; or from about 70 to 100 vol. % when the free-oxygen containing gas is introduced as air preheated to a temperature in the range of about 1000° to 1200° F. The multiphase mixture in the pre-mix zone is at a temperature below its autoignition temperature. The multiphase mixture leaves burner 1 by way of exit orifice 21 at a discharge velocity in the range of about 75 to 600 ft. per sec., say about 150 to 350 ft. per sec., and above the flame propagation velocity and passes downwardly directly into the unobstructed reaction zone of the partial oxidation gas generator.

FIG. 3 is a vertical sectional view of another embodiment of the downstream end of outer conduit 16 as shown in FIG. 2. In FIG. 3, converging exit nozzle 21 is in the shape of an American Society of Mechanical Engineer's (A.S.M.E.) standard long-radius nozzle. It may or may not be cooled, such as by means of annular cooling chamber 2, in the manner shown in FIG. 2. A further description of said nozzle may be found in "Thermodynamics Fluid Flow and Heat Transmission" by Huber O. Croft, page 155, First Edition, 1938 McGraw-Hill Book Company.

FIG. 4 is a vertical sectional view of another embodiment of the downstream end of outer conduit 16 as shown in FIG. 2. In FIG. 4, exit nozzle 35 at the tip of the burner is made from a wear resistant material such as tungsten carbide or silicon carbide. Exit nozzle 35 comprises a frusto-conical rear portion 22 which develops into a coaxial right cylindrical front portion 23. The frusto-conical outside diameter of exit orifice 35 is supported by coaxial frusto-conical mating cavity 36 in annular cooling chamber 2. For example, exit orifice 35 made from tungsten carbide may be connected to the downstream tip of outer conduit 16 by joining the back surface 37 of cooling chamber 2 to the front surface of end flange 38 at the downstream end of outer conduit 16. Cooling water may be introduced into cored section 24 of cooling chamber 2 in the manner shown for inlet pipe 3 in FIG. 1. Optionally, a cooling coil may encircle outer conduit 16 in the manner shown for coil 4 in FIG. 1. Hot high velocity slurries of solid fuel are abrasive. The life of the subject burner may be considerably extended by making exit nozzle 35 from a wear resistant material.

FIG. 5 is a vertical sectional view of the downstream end of another embodiment of the pre-mix burner shown in FIGS. 1 and 2. Concurrent streams of different materials flowing through coaxial retracted central conduit 15 and simultaneously through annular passage 17 are successively mixed together in pre-mix chambers 25 and 40. While the pre-mix zone in the embodiment in FIG. 5 is shown as comprising two separate coaxial pre-mix chambers 25 and 40 in series, the pre-mix zone for other embodiments of the subject invention may actually comprise one or more, such as 2 to 5 coaxial pre-mix chambers. For example, as previously noted, the embodiment of the burner shown in FIGS. 1 and 2 have one pre-mix chamber 25, while three pre-mix chambers 25, 40, and 41 are included in the embodiment of the burner shown in FIG. 6. Each pre-mix chamber in FIGS. 5 and 6, except for the first chamber in the line, comprises a coaxial cylindrical body portion 45 followed by a coaxial at least partially converging outlet portion 22 or 46 in FIG. 6 that may optionally develop into a straight cylindrical portion 49. Optionally, such outlets may be made from a thermal and wear resistant material i.e. silicon or tungsten carbide, such as described previously in connection with FIG. 4. In embodiments having a plurality of pre-mix chambers, the first pre-mix chamber in the line may have a straight coaxial cylindrical body portion 47, that discharges through circular orifice 39 directly into the next in line coaxial pre-mix chamber 40. Preferably, the mixture leaving one pre-mix chamber expands into the next successive pre-mix chamber. When the mixture is accelerated and expanded through a final exit nozzle at the tip of the burner into the combustion chamber, a more stable and efficient combustion pattern results. The temperature, pressure and velocity ranges for the streams of materials passing through the various passages of the burner are substantially the same as those discussed previously. The inlet to the first pre-mix chamber 25 may have a converging inlet 48 as shown in FIG. 5, or that shown in FIG. 2. One or more of the pre-mix chambers may be a converging frusto-conical shaped section.

FIG. 6 is a vertical sectional view of the downstream end of an embodiment of a retracted central conduit 15 pre-mix burner similar to burner 1, as shown in FIG. 1, but modified to provide two coaxial annular passages i.e. intermediate annular passage 17 and outer annular passage 51. Further, the pre-mix zone comprises three successive free-flow coaxial pre-mix chambers 25, 40, and 41. By spacing means 18, concentric coaxial outer conduit 52, retracted coaxial intermediate conduit 53, and retracted coaxial central conduit 15 may be radially spaced from each other to provide said separate annular passages and pre-mix chambers with substantially no obstruction to the free-flow of materials therethrough. The downstream tip 20 of central conduit 15 is retracted upstream from face 6 of the burner a distance in the range of 2 or more, say 3 to 10 times the minimum diameter of converging exit orifice 21. The downstream tip 54 of intermediate conduit 53 is retracted upstream from face 6 of the burner a distance in the range of 0 to 12, say 1 to 5 times the minimum diameter of converging exit orifice 21. Central conduit 15, and annular passages 17 and 51 are respectively connected upstream to separate inlets, in a manner similar to that shown in FIG. 1. The burner tip may be cooled by means of annular cooling chamber 2 which is coaxial with the central longitudinal axis of the burner at the downstream end in the manner shown. Alternately, cooling chamber 2 may be eliminated.

In the operation of the embodiment of the burner shown in FIG. 6, the feedstreams simultaneously and concurrently passing through central conduit 15 and intermediate annular passage 17 at different velocities impinge and mix with each other in the first pre-mix chamber 25. The impingement of one reactant stream, such as the liquid slurry of solid carbonaceous fuel in a liquid medium with another reactant stream, such as a gaseous stream of free-oxygen containing gas, stream, or temperature moderator at a higher velocity causes the liquid slurry to break up into a fine spray. The multiphase mixture then passes into the second pre-mix chamber 40 for additional mixing. Leaving chamber 40 by way of converging exit nozzle 46 and circular orifice 54 at the downstream tip of chamber 40, the multiphase mixture passes into the third pre-mix chamber 41. The third feedstream enters the burner upstream through a separate inlet (not shown), and passes down outer annular passage 51. When the set back of orifice 54 at the tip of intermediate conduit 53 from face 6 of the burner is greater than 0, say in the range of about 1.0 to 5 times the minimum diameter of exit orifice 21, then the third feed stream may mix with the first and second feed streams in pre-mix chamber 41 to produce a multiphase mixture. Further, in such embodiment, there may be 2 or more say 2 to 5 cylindrical coaxial pre-mix chambers in series. The multiphase mixture passes through converging nozzle 21 at the downstream tip of the burner into the reaction zone of the gas generator.

In the embodiment of the burner with a setback of orifice 54 of about 0, then the third feedstream passing through outer annular passage will contact and mix with the multiphase mixture of the other two feedstreams from the pre-mix zone downstream from face 6 of the burner, say about 1 to 24 inches. Further, in such embodiment, there may be one or more say 2 to 5 cylindrical coaxial pre-mix chambers in series. For example, the stream of free-oxygen containing gas is passed through either the central or outer annular passage and the stream of liquid hydrocarbonaceous material is passed through the other passage i.e. the central conduit or outer annular passage whichever is free. Simultaneously, a slurry stream of solid carbonaceous fuel and water is passed through the intermediate passage. Alternately, the stream of free-oxygen containing gas is passed through either the intermediate or outer annular passage and the stream of liquid hydrocarbonaceous material is passed through the other passage i.e. the intermediate or outer annular passage whichever is free. Simultaneously, a slurry stream of solid carbonaceous fuel and water is passed through the central conduit. The temperature, pressure and velocity ranges for the streams of materials passing through the various passages of the burner are substantially the same as those discussed previously. For example, see the discussion with respect to FIG. 2. The conditions for the liquid hydrocarbonaceous material are substantially the same as those given for the slurry of solid carbonaceous fuel. The feedstream flowing through the outer conduit of the burner mixes with the multiphase mixture of the other two feedstreams from the pre-mix zone. However, this mixing takes place downstream from the face of the burner in the reaction zone of the free-flow partial oxidation gas generator.

Burning of the slurry while passing through the pre-mix zone of the burner may be prevented by discharging the multiphase mixture at the exit orifice at the tip of the burner with a discharge velocity which is greater than the flame propagation velocity. Flame speeds are a function of such factors as composition of the mixture, temperature and pressure. They may be calculated by conventional methods or determined experimentally.

Advantageously, by means of the subject retracted central conduit pre-mix burner, the exothermic partial oxidation reactions take place a sufficient distance downstream i.e. 6 inches to 2 feet from the burner face so as to protect the burner from thermal damage.

As the mixture passes freely through the subject unobstructed burner its velocity changes many times. At various points in the burner the velocity of the mixture may range from about 20 to 600 ft. per sec. As the mixture flows from one pre-mix chamber to the next, the velocity changes are mainly the result of changes in the diameter of the flow path and the quantity and temperature of the mixture. This promotes a thorough mixing of the components. Further, by operating in the region of turbulent flow, mixing may be maximized. Other burner design considerations such as size, length and number of chambers, and external cooling may be calculated from such factors as quantity, temperature and composition of the feedstreams, and desired amount of volatilization of the liquid carrier i.e. 0 to 100 vol. %.

The size relationship between successive pre-mix chambers in the subject burners may be expressed in the following manner: For burners having 1 to 5 pre-mix chambers successfully numbered 1 to 5 with chamber 5 being located closest to the downstream tip of the burner, the ratio of the diameter of any one of said chambers to the next chamber downstream in the line i.e. $D_1:D_2$; $D_2:D_3$; $D_3:D_4$; or $D_4:D_5$ may be in the range of about 0.2–1.2. Similarly, the ratio of the lengths of any one pre-mix chamber to the next downstream pre-mix chamber in the line, i.e. $L_1:L_2$; $L_2:L_3$; $L_3:L_4$; or $L_4:L_5$ may be in the range of about 0.1–1.0.

Advantageously, in one embodiment of the subject burner, as shown in FIG. 6 the material passing through outer annular passage 51 i.e. see Table III supra is heated by indirect heat exchanger with the hot gaseous reaction products that recirculate in the reaction zone on the outside of the burner. By indirect and direct heat exchange, the heated material in annular passage 51 may then heat the other reactant materials simultaneously and concurrently passing through the burner. In such case, all or a portion of the cooling coils 4 may be eliminated from the burner. Further, the reactants may be preheated and the liquid carrier may be vaporized from 0 to 100 vol. %.

In still another embodiment of the subject burner shown in FIG. 6, a gaseous material is passed through outer annular conduit 51. At least a portion i.e. about 5 to 100 vol. % of the gaseous feedstream passing through annular conduit 51 is bled through a plurality of small diameter passages i.e. about 0.032 to 0.50 inches diameter or holes of the same diameter, in a plurality of circumferential rings in the walls of intermediate conduit 53 at one or more locations 60-62 along its length. In such case, the downstream outlet 56 of outer annular passage 51 may be completely or partially blocked. For example, annular plate 57 is optionally shown in FIG. 6. Optionally, plate 57 may contain a plurality of small diameter holes 58 i.e. 0.060 to 0.75 inches diameter leading into pre-mix chamber 41. Annular plate 57 may be placed perpendicular to the central longitudinal axis of the burner. By this means at least a portion of the third feedstream flowing in outer annular passage 51 may be pre-mixed with the materials simultaneously flowing through at least one or all of the following passages in the burner at a lower pressure; intermediate passage 17, and pre-mix chambers 25, 40 and 41. For example, atomizing of the slurry of solid carbonaceous fuel and mixing it with the other feed streams may be facilitated by means of high-velocity, high pressure jet stream of a gaseous stream passing through said passages at one or more locations 58 and 60-62. The gaseous material may be selected from the group consisting of steam, free-oxygen containing gas, $CO_2$, $N_2$, a recycle portion of the product gas, and mixtures thereos. The gaseous material may be introduced into the burner at a temperature in the range of about ambient to 1500° F. and a velocity in the range of about 100 feet per second to sonic velocity. The pressure of the gaseous material may be in the range of about 76 to 4500 psia and is greater than the pressure of the feedstreams passing through the central and intermediate passages.

In other embodiments, converging inlet 48 and the converging portion 22 of exit orifice 21 of the burners shown in FIGS. 5 and 6 and converging portion 46 in the burner shown in FIG. 6 may be made from a wear resistant material such as tungsten carbide or silicon carbide. The wear resistant material may be shaped in the manner described in connection with the embodiments shown in FIGS. 3 and 4.

SPECIFIC EXAMPLE

The following is an example of the subject process and apparatus employed in the partial oxidation of a slurry of coal and water with air; but the invention is not to be construed as limited thereto.

EXAMPLE 1

Fuel gas is produced in a vertical cylindrical refractory lined steel pressure vessel free from catalyst or any obstruction to the free-flow of materials therethrough. The volume of the reaction zone is about 160 cubic feet.

The feedstreams are introduced into the reaction zone by way of a single annulus pre-mix burner having a retracted central conduit and two coaxial cylindrically shaped pre-mix chambers in tandem as shown in FIG. 5. The pre-mix burner is vertically mounted in a flanged port at the top of the gas generator along the central longitudinal axis of the gas generator. Exit orifice 20 of the burner is retracted about 26 inches from the downstream face of the burner, and about 6 inches from circular exit orifice 39 at the end of the first pre-mix chamber 25. The length of the second pre-mix chamber 40 is 20 inches and the length of cylindrical portion 23 of exit nozzle 21 is 1.5 inches. The diameters of exit orifices 39 and 23 are 3.1 inches each. The outside and inside diameters of central conduit 15 are respectively 1.315 and 1.049 inches. The inside diameter of passage 17 and the diameter of pre-mix chamber 40 are 4.563 inches each.

A slurry of bituminous coal and water having a solids content of 65 wt. % is prepared and passed through the center conduit 15 of the burner in liquid phase at a temperature of 100° F., pressure of 600 psig, and velocity of 10.4 feet per sec. The slurry comprises about 10,300 lbs. per hr of coal and 5,470 lbs. per hr of water. The coal is ground to a particle size so that 100% passes through an ASTM E 11-70 Sieve Designation Standard 1.4 mm and at least 80% passes through an ASTM E 11-70 Sieve Designation Standard 425 μm. The ultimate analysis of the coal in wt. % (moisture free basis) comprises: carbon 69.52; hydrogen 5.33; nitrogen 1.25; sulfur 3.86; oxygen 10.02; and ash 10.02.

Simultaneously, about 11.8 cubic feet per second of air comprising 21 mol % oxygen at a temperature of 1000° F., pressure of 600 psig, and velocity of 113 feet per second are passed through the annular passage 17 of the burner. Mixing of the two feedstreams together takes place in pre-mix chamber 25. The mixture leaves through orifice 39 at a velocity of 271 feet per sec. and expands into pre-mix chamber 40 where intimate mixing of the components takes place. About 100 vol. % of the water in the slurry vaporizes in the burner and the mixture passes through pre-mix chamber 40 at a velocity of 125 ft. per sec. The multiphase mixture passes through exit nozzle 21 at the downstream tip of the burner at a temperature of 423° F. and a velocity of 194 ft. per sec. and directly enters the reaction zone of the partial oxidation gas generator.

Noncatalytic partial oxidation of the solid fuel takes place in the reaction zone at an autogenous temperature of 2800° F. and a pressure of 500 psig. About 23 million standard cubic feet per operating day of low BTU fuel gas are produced having the following composition in mole %: CO 17.1, $H_2$ 10.1, $CO_2$ 6.7, $H_2O$ 12.4, $N_2$ 52.6, A 0.6, $H_2S$ 0.5. The heating value of the purified gas streams is about 110 BTU per SCF.

Advantageously, by employing the subject burner in place of a conventional burner, the specific oxygen consumption may be reduced 10% and problems of combustion instability are avoided.

Although modifications and variations of the invention may be made without departing from the spirit and scope thereof, only such limitations should be imposed as are indicated in the appended claims.

We claim:

1. A burner for mixing together a feedstream comprising a pumpable slurry of solid carbonaceous fuel in a liquid carrier with a separate feed stream comprising a free-oxygen containing gas optionally in admixture with a temperature moderator to produce a multiphase mixture and introducing said multiphase mixture into a partial oxidation gas generator comprising: a retracted central conduit coaxial with the central longitudinal axis of the burner and having an upstream inlet through which a first feedstream comprising said free-oxygen containing gas optionally in admixture with a temperature moderator may be separately introduced, and a downstream discharge outlet; an outer coaxial conduit concentric with said central conduit and having an upstream inlet through which a second feedstream comprising a pumpable slurry in the range of about of 30 to 75 wt.% of solid carbonaceous fuel in a liquid carrier may be separately introduced, and an exit nozzle coaxial with and terminating said outer conduit at the downstream tip of the burner comprising a converging frusto-conical rear portion and a right cylindrical front portion which terminates at the downstream face of the burner, and the height of the front cylindrical portion of said exit nozzle is in the range of about 0.1 to 1.0 times its own diameter; a coaxial annular shaped cooling chamber surrounding said exit nozzle at the burner tip; wherein said central conduit discharge outlet is retracted upstream from the downstream face of the burner a distance of two or more times the minimum diameter of said outer conduit downstream exit nozzle to provide a pre-mix zone comprising a single communicating pre-mix chamber coaxial with the central longitudinal axis of said burner wherein intimate mixing together of the feedstreams takes place and a controlled amount of the liquid carrier is vaporized without burning; and means for radially spacing said central and outer conduits from each other to provide a coaxial annular passage through which said second feedstream may separately pass concurrently with said first feedstream into said pre-mix zone where a multiphase mixture is produced prior to being discharged through said outer conduit exit nozzle.

2. A burner for mixing together separate feed streams comprising a pumpable slurry stream comprising in the range of about 30 to 75 wt.% solid carbonaceous fuel in a liquid carrier and a stream of free-oxygen containing gas optionally in admixture with a temperature moderator to produce a multiphase mixture and introducing said multiphase mixture into a partial oxidation gas generator comprising: a retracted central conduit coaxial with the central longitudinal axis of the burner and having an upstream inlet through which a first feedstream may be separately introduced, and a downstream discharge outlet; an outer coaxial conduit concentric with said central conduit and having an upstream inlet through which a second feedstream may be separately introduced, and an exit nozzle coaxial with and terminating said outer conduit at the downstream tip of the burner comprising a converging frusto-conical rear portion and a right cylindrical front portion which terminates at the downstream face of the burner, and the height of the front cylindrical portion of said exit nozzle is in the range of about 0.1 to 1.0 times its own diameter; a coaxial annular shaped cooling chamber surrounding said exit nozzle at the burner tip; wherein said central conduit discharge outlet is retracted upstream from the downstream face of the burner a distance of two or more times the minimum diameter of said outer conduit downstream exit nozzle to provide a pre-mix zone wherein intimate mixing together of the feedstreams takes place and a controlled amount of the liquid carrier in the range of about 0 to 100 vol.% is vaporized without burning, said pre-mix zone comprising at least two cylindrically shaped communicating pre-mix chambers in tandem and coaxial with the central longitudinal axis of said burner, and wherein each pre-mix chamber except for the first chamber in the line comprises a coaxial cylindrical body inlet portion and a coaxial at least partially converging frusto-conical outlet portion that may optionally develop into a straight cylindrical portion and the first pre-mix chamber in the line has a converging inlet portion, and a straight coaxial cylindrical body portion that discharges through a circular orifice directly into the next in line coaxial pre-mix chamber; and means for radially spacing said central and outer conduits from each other to provide a coaxial annular passage through which said second feedstream may separately pass concurrently with said first feedstream into said pre-mix zone where said multiphase mixture is produced prior to being discharged through said outer conduit exit nozzle.

3. The burner as described in claim 2 wherein the converging outlet portion of said pre-mix chambers is made from tungsten carbide or silicon carbide.

4. The burner as described in claim 2 wherein said pre-mix chambers are successively numbered 1 to 5 and the ratio of the diameter of any one of said chambers to the diameter of the next chamber in the line i.e. $D_1:D_2$; $D_2:D_3$; $D_3:D_4$; or $D_4:D_5$ may be in the range of about 0.2–1.2; and the ratio of the length of any one pre-mix chamber to the length of the next pre-mix chamber in the line, i.e. $L_1:L_2$; $L_2:L_3$; $L_3:L_4$; or $L_4:L_5$ may be in the range of about 0.1–1.0.

5. The burner as described in claims 1 or 2 wherein the outer conduit exit nozzle is made from a thermal and wear resistant material.

6. The burner described in claims 1 or 2 wherein said cooling chamber and outer conduit exit nozzle constitute a single piece of thermal and wear resistant material.

7. The burner as described in claim 6 wherein said thermal and wear resistant material is tungsten carbide or silicon carbide.

8. The burner as described in claims 1 or 2 further provided with a cooling coil that encircles the outside diameter of the burner along its length and which is connected to said face cooling chamber to provide cooling water.

9. The burner of claims 1 or 2, wherein the ratio of the diameter of the central conduit discharge outlet to the minimum diameter of the outer conduit downstream exit nozzle is in the range of about 0.20 to 1.5.

10. A burner for introducing a multiphase mixture of feedstreams including a pumpable slurry feedstream of solid carbonaceous fuel in a liquid carrier in liquid phase, a feedstream of free-oxygen containing gas optionally in admixture with steam, and a gaseous feedstream into the reaction zone of a partial oxidation gas generator comprising: a retracted central conduit coaxial with the central longitudinal axis of the burner and having an upstream inlet through which a first or second feedstream may be separately introduced, and a circular downstream discharge outlet; an outer coaxial conduit concentric with said central conduit and having an upstream inlet through which a third feedstream is introduced and a converging exit nozzle terminating said outer conduit and comprising a frusto-conical shaped rear portion and a right cylindrical shaped front portion which terminates at the downstream face of the burner, and the height of the front cylindrical portion of said exit nozzle is in the range of about 0.1 to 1.0 times its own diameter and a coaxial annular shaped cooling chamber surrounding said exit nozzle at the burner tip; and said central conduit discharge outlet is retracted upstream from the downstream face of the burner a distance of two or more times the minimum diameter of said outer conduit downstream exit nozzle to provide a pre-mix zone comprising at least one cylindrically shaped pre-mix chamber coaxial with the central longitudinal axis of said burner; an intermediate coaxial conduit concentric with said central conduit and having an upstream inlet through which the remaining one of said first and second feedstreams may be introduced, and a converging at least partially frusto-conical shaped downstream exit nozzle terminating said intermediate conduit, and the tip of said intermediate conduit exit nozzle is retracted upstream from the downstream face of the burner a distance of 0 to 12 times the minimum diameter of said outer conduit downstream exit nozzle; and means for radially spacing said central, intermediate, and outer conduits with respect to each other to provide intermediate and outer coaxial annular passages, and said intermediate annular passage is situated between the outside diameter of the central conduit and the inside diameter of the intermediate conduit and is the passage through which said first or second feedstream may separately pass concurrently with the feedstream passing through the central conduit into said pre-mix zone where a multiphase mixture of feedstreams is produced and at least a portion of said liquid carrier is vaporized without burning, and said outer annular passage is situated between the outside diameter of said intermediate conduit and the inside diameter of said outer conduit and is the passage through which said third feedstream may separately pass concurrently with the other two feedstreams and then mix with said multiphase mixture of feedstreams.

11. The burner as described in claim 10 wherein the tip of said intermediate conduit exit nozzle is retracted upstream from the downstream face of the burner a distance in the range of about 1.0 to 5 times the minimum diameter of said outer conduit exit nozzle.

12. The burner as described in claim 10 wherein the upstream retraction of the tip of said intermediate conduit exit nozzle from the downstream face of the burner is about 0, and said third feedstream mixes with the multiphase mixture of said first and second feedstreams downstream from the face of the burner.

13. The burner as described in claim 10 further provided with cooling coils that encircle the outside diameter of the burner along its length.

14. The burner as described in claim 10 wherein the walls of said intermediate conduit contains a plurality of small diameter holes or passages to permit the third feedstream selected from the group consisting of steam, free-oxygen containing gas, $CO_2$, $N_2$, a recycle portion of the product gas, and mixtures thereof and flowing in said outer passage to pass through and mix with one or both of the other feedstreams simultaneously flowing at a lower pressure through the other passages or pre-mix zone of the burner.

15. A burner for mixing together three separate feedstreams including a pumpable slurry feedstream of solid carbonaceous fuel in a liquid carrier in liquid phase, a feedstream of free-oxygen containing gas optionally in admixture with steam, and a gaseous feedstream and introducing the resulting multiphase mixture into a partial oxidation gas generator comprising: a central conduit coaxial with the central longitudinal axis of the burner and having an upstream inlet through which a first feedstream may be introduced and a circular downstream discharge outlet, an outer coaxial conduit concentric with said central conduit and having an upstream inlet through which a third feedstream is introduced and a converging exit nozzle terminating said outer conduit and comprising a frusto-conical shaped rear portion and a right cylindrical shaped front portion which terminates at the downstream face of the burner and a coaxial annular shaped cooling chamber surrounding said exit nozzle at the burner tip, and said central conduit discharge outlet is retracted upstream from the downstream face of the burner a distance of 3 to 10 times the minimum diameter of said outer conduit downstream exit nozzle to provide a pre-mix zone comprising 2 to 5 cylindrically shaped pre-mix chambers in tandem and coaxial with the central longitudinal axis of said burner, and wherein each pre-mix chamber except for the first chamber in the line comprises a coaxial cylindrical body inlet portion and a coaxial at least partially converging frusto-conical outlet portion that may optionally develop into a straight cylindrical portion and the first pre-mix chamber in the line has a converging inlet portion and a straight coaxial cylindrical body portion that discharges through a circular orifice directly into the next in line coaxial pre-mix chamber; an intermediate coaxial conduit concentric with said central conduit and having an upstream inlet through which a second feedstream may be introduced, and a converging at least partially frusto-conical shaped downstream exit nozzle terminating said intermediate conduit, and the tip of said intermediate conduit exit nozzle is retracted upstream from the downstream face of the burner a distance of 1 to 5 times the minimum diameter of said outer conduit downstream exit nozzle; and means for radially spacing said central, intermediate, and outer conduits with respect to each other to provide intermediate and outer coaxial annular passages, and said intermediate annular passage is situated between the outside diameter of the central conduit and the inside diameter of the intermediate conduit and is the passage through which said second feedstream may separately pass concurrently with said first feedstream into said pre-mix zone where a multiphase mixture of said first and second feedstreams is produced and from 0 to 100 vol.% of said liquid carrier is vaporized without burning, and said outer annular passage is situated between the outside diameter of said intermediate conduit and the inside diameter of said outer conduit and is the passage through which said third feedstream may separately pass concurrently with said first and second feedstreams and then mix with said multiphase mixture of said first and second feedstreams upstream from the downstream face of the burner.

16. The burner as described in claim 15 wherein the walls of said intermediate conduit contain a plurality of small diameter holes or passages in a plurality of circumferential rings along its length to permit at least a portion of said third feedstream flowing in said outer annular conduit to pass through and mix with one or more of the other materials simultaneously flowing at a lower pressure through the other passages or pre-mix zone of the burner, and provided with blocking means at the downstream outlet of said outer annular passage for completely or partially closing the downstream outlet of said outer annular passage.

17. The burner as described in claim 16 wherein said blocking means comprises an annular plate with or without a plurality of small diameter holes, said plate being perpendicular to the central longitudinal axis of the burner.

* * * * *

UNITED STATES PATENT AND TRADEMARK OFFICE
CERTIFICATE OF CORRECTION

PATENT NO. : 4,364,744
DATED : December 21, 1982
INVENTOR(S) : W. B. CROUCH, G. N. RICHTER, C. P. MARION, B. REYNOLDS and A. BRENT and E. T. CHILD.

It is certified that error appears in the above—identified patent and that said Letters Patent is hereby corrected as shown below:

Column 7,
Correct Table III as follows:

| Entry | Central Conduit 15 | Intermediate Annulus 17 | Outer Annulus 51 |
|---|---|---|---|
| 21 | B + C | A | E |
| 22 | Delete A | Delete E | |

Signed and Sealed this

Twenty-second Day of March 1983

[SEAL]

Attest:

GERALD J. MOSSINGHOFF

*Attesting Officer*          *Commissioner of Patents and Trademarks*